United States Patent
Nemedi

(10) Patent No.: US 7,028,935 B2
(45) Date of Patent: Apr. 18, 2006

(54) APPARATUS AND METHOD FOR SHREDDING WET CHIP MATERIALS

(75) Inventor: William D. Nemedi, Paw Paw, MI (US)

(73) Assignee: Inter-Source Recovery Systems, Inc., Kalamazoo, MI (US)

( * ) Notice: Subject to any disclaimer, the term of this patent is extended or adjusted under 35 U.S.C. 154(b) by 15 days.

(21) Appl. No.: 10/611,526

(22) Filed: Jul. 1, 2003

(65) Prior Publication Data

US 2005/0001080 A1    Jan. 6, 2005

(51) Int. Cl.
*B02C 18/18*    (2006.01)
*B02C 13/04*    (2006.01)

(52) U.S. Cl. .................. 241/243; 241/242; 241/294; 241/300.1

(58) Field of Classification Search ............. 241/242, 241/243, 294, 300.1
See application file for complete search history.

(56) References Cited

U.S. PATENT DOCUMENTS

| | | | |
|---|---|---|---|
| 3,690,335 A * | 9/1972 | Ichimura et al. .............. 137/54 |
| 3,960,335 A | 6/1976 | Häberle ....................... 241/236 |
| 4,000,858 A | 1/1977 | Rudzinski .................... 241/27 |
| 4,186,888 A | 2/1980 | Galanty ................... 241/46.06 |
| 4,205,799 A * | 6/1980 | Brewer ........................ 241/243 |
| 4,377,259 A | 3/1983 | Areaux et al. ................. 241/73 |
| 4,424,891 A | 1/1984 | Dudley et al. .................. 193/2 |
| 4,629,134 A | 12/1986 | Pennekamp .................. 241/87 |
| 4,691,871 A | 9/1987 | Mochizuki ................... 241/166 |
| 4,936,822 A | 6/1990 | Nemedi ....................... 494/43 |
| 5,106,487 A | 4/1992 | Nemedi ....................... 209/12 |
| 5,110,060 A | 5/1992 | Lundquist .................... 241/158 |
| 5,135,178 A | 8/1992 | Strohmeyer ................. 241/295 |
| 5,236,139 A | 8/1993 | Radtke ........................ 241/236 |
| 5,252,208 A | 10/1993 | Nemedi ....................... 210/373 |
| 5,264,124 A | 11/1993 | Nemedi .................... 210/380.1 |
| 5,275,727 A | 1/1994 | Nemedi ....................... 210/373 |
| 5,330,637 A | 7/1994 | Nemedi ....................... 210/232 |
| 5,345,665 A | 9/1994 | Nemedi .................... 29/402.15 |
| 5,383,941 A | 1/1995 | Nemedi .................... 29/402.08 |
| RE35,307 E | 7/1996 | Nemedi ......................... 494/43 |
| 5,680,999 A * | 10/1997 | Wada .......................... 241/236 |
| 5,803,143 A * | 9/1998 | Willis ......................... 144/373 |
| 5,944,992 A | 8/1999 | Nemedi et al. ............. 210/373 |
| 6,079,645 A * | 6/2000 | Henreckson et al. ....... 241/37.5 |
| 6,094,795 A * | 8/2000 | Davenport ................. 29/407.1 |
| 6,125,992 A | 10/2000 | Dudley ........................ 198/741 |
| 6,126,099 A | 10/2000 | Fachinger et al. ............ 241/81 |
| 6,129,851 A | 10/2000 | Nemedi et al. ............. 210/781 |
| 6,253,929 B1 | 7/2001 | Nemedi et al. ............. 210/373 |
| 6,375,841 B1 | 4/2002 | Nemedi et al. ............. 210/298 |

(Continued)

OTHER PUBLICATIONS

Chip Processing (Brochure), Inter-Source Recovery Systems, Inc., (circa 1999).

(Continued)

*Primary Examiner*—Derris H. Banks
*Assistant Examiner*—Jason Y. Pahng
(74) *Attorney, Agent, or Firm*—Marshall, Gerstein & Borun LLP

(57) ABSTRACT

A shredder apparatus and method for shredding wet chip materials in which the shredder utilizes a shredder mechanism having a shaft attached to a frame, a bearing assembly disposed on the shaft, and a rotatable rotor disposed on the bearing assembly. First shredder members are attached to and rotatable with the rotor, and cooperate with second shredder members attached to the frame to shred wet chip materials fed into the shredder apparatus.

34 Claims, 10 Drawing Sheets

U.S. PATENT DOCUMENTS

| | | | |
|---|---|---|---|
| 6,405,877 B1 | 6/2002 | Nemedi et al. | 210/498 |
| 6,540,087 B1 | 4/2003 | Nemedi et al. | 209/146 |
| 6,572,779 B1 | 6/2003 | Nemedi et al. | 210/787 |
| 2003/0178518 A1 | 9/2003 | Nemedi | 241/243 |

OTHER PUBLICATIONS

"Two-Stage Scrap Metal Shredder," U.S. Appl. No. 08/785,645, (filed 1997—abandoned).

* cited by examiner

APPARATUS AND METHOD FOR SHREDDING WET CHIP MATERIALS

FIELD

The method for shredding and the shredder apparatus disclosed herein relate generally to the shredding of wet chip materials that subsequently are separated into dry chips and fluid; and, more specifically, to an improved shredder apparatus having a rotor shredder mechanism that allows for shredding of bales of stringy wet chip into granular wet chips.

BACKGROUND

Bales or batches of wet chip materials often are generated in the course of machining operations. The wet chip materials include both relatively small wet chips, referred to herein as granular wet chips, and stringy pieces of wet chips. The chips are covered or coated with lubricating, cooling or other fluid. Additionally, undesired solids such as bolts, nuts, etc. sometimes are found in the bales or batches of wet chip material.

Prior to sending wet chips to a centrifugal separator, where wet chips are separated into dry chips and fluids, such as is illustrated in Nemedi U.S. Pat. No. 5,106,487, the stringy wet chips generally must be shredded into granular wet chips. Otherwise, commercially-available wet chip separation systems sometimes will not function due to the large size of the stringy wet chips. The wet chip material is fed into a shredder apparatus where the stringy wet chips are shredded into granular wet chips that can be more readily transported in the wet chip separation system free from interfering with the wet chip separation process or damaging the wet chip separation equipment.

Shredder apparatuses for shredding wet chip materials are well known in the art. Often the shredder apparatus utilizes two rotatable shredder shafts each mounted in bearing units disposed in a shredder frame. Shredder members are disposed on each shaft, the rotating shredder members on one shaft cooperating with shredder members on the other shaft to shred wet chip material. Shredder apparatuses that employ a plurality of rotating shafts generally are relatively large, bulky units that, because of their size, are not adaptable to certain applications that have reduced space constraints.

In other applications, it is known to employ a wet chip shredder apparatus that utilizes a plurality of first shredder members disposed on a single rotatable shaft. A plurality of second shredder members is fixed to the shredder frame. In a shredding operation the first shredder members engage the second shredder members to shred wet chip material. An example of this type shredder is shown and disclosed in the co-pending application Ser. No. 10/100,786, filed by the present inventor on Mar. 19, 2002. While this shredder device is satisfactory for shredding wet chip material, it has been observed that lubricating and flume fluid can migrate to the location of bearing units that house the rotatable shaft. A concern exists that, over time, the fluid could possibly contaminate or otherwise damage one or more of the bearing units.

Further, it has been found in some applications that relatively heavy objects such as metal bolts, nuts, etc. are located in the bales of wet chip material. In some instances, these heavy objects can cause the shredder to jam. On such occasions, the shredder device must be stopped until the jam is cleared. In other, situations, these heavy objects pass through the shredder and travel in the system with the potential for causing damage to a centrifugal wet chip separator or other parts of the wet chip separation system.

SUMMARY

Briefly, a shredder apparatus may have a shredder mechanism that includes a shaft attached to a shredder apparatus frame. A bearing assembly, comprising for example two spaced bearings, is disposed on the shaft and located inwardly from the shaft ends. A rotatable rotor, comprising for example an elongated cylindrical member, may be positioned over the shaft and is disposed on the bearing assembly. The rotor may be of a length such that the rotor extends over the bearing assembly, whereby the bearing assembly is sandwiched between the shaft and rotor. Seal members may be disposed on the shaft and located at the rotor ends serve to preclude lubricating, coolant or other fluid from coming in contact with the bearing assembly.

Spaced shredder wheels, each having a plurality of spaced shredder arms extending outwardly from the wheel, are attached to and rotatable with the rotor. A plurality of spaced comb members is disposed on, but is not rotatable with, the rotor. The comb members are attached to the shredder assembly frame, whereby, upon rotation of the rotor, a shredder wheel will cooperate with a comb member to shred wet chip materials into granular wet chips.

In one embodiment, the shredder rotor is rotated in a direction opposite a feed direction of wet chip materials to be shredded. The shredder arms on the shredder wheels contact wet chip materials, e.g., aluminum, steel or other metal chip materials, and lift the wet chip materials upwardly into the shredder. The shredder wheels and comb members then cooperate to shred the wet chip materials into granular wet chips that may be more easily transported through a wet chip separation system to one or more centrifugal separators. During the course of the shredding operation, undesired heavy objects may drop either by gravity or centrifugal force into a removable tray attached to the shredder assembly frame, thereby being separated from the wet chips.

In a further embodiment, the shredder rotor is rotated in the same direction as the feted direction of the wet chip material to be shredded. The stringy wet chip material will shred at the location, of a second shredder arm on the comb member. In the event a heavy, unwanted object contacts the second shredder arm, an increased motor amperage will occur and the motor is signaled to change direction. The unwanted object will then be lifted in the arms of the shredder wheels and ultimately transported to a drop out opening or tray. The motor will then change direction again, and the shredding operation will resume principally at the location of the second shredder arm.

To minimize potential shredder wheel misalignment problems that sometimes occur with shredder apparatuses, spacers may be disposed between the shredder wheels. By separating the shredder wheels, the possibility of a shredder wheel contacting another shredder wheel due to vertical misalignment is reduced.

Other advantages of such a shredder apparatus will become apparent from the drawings and the following detailed description of the shredder assembly and method of shredding.

DETAILED DESCRIPTION

Figure 4:
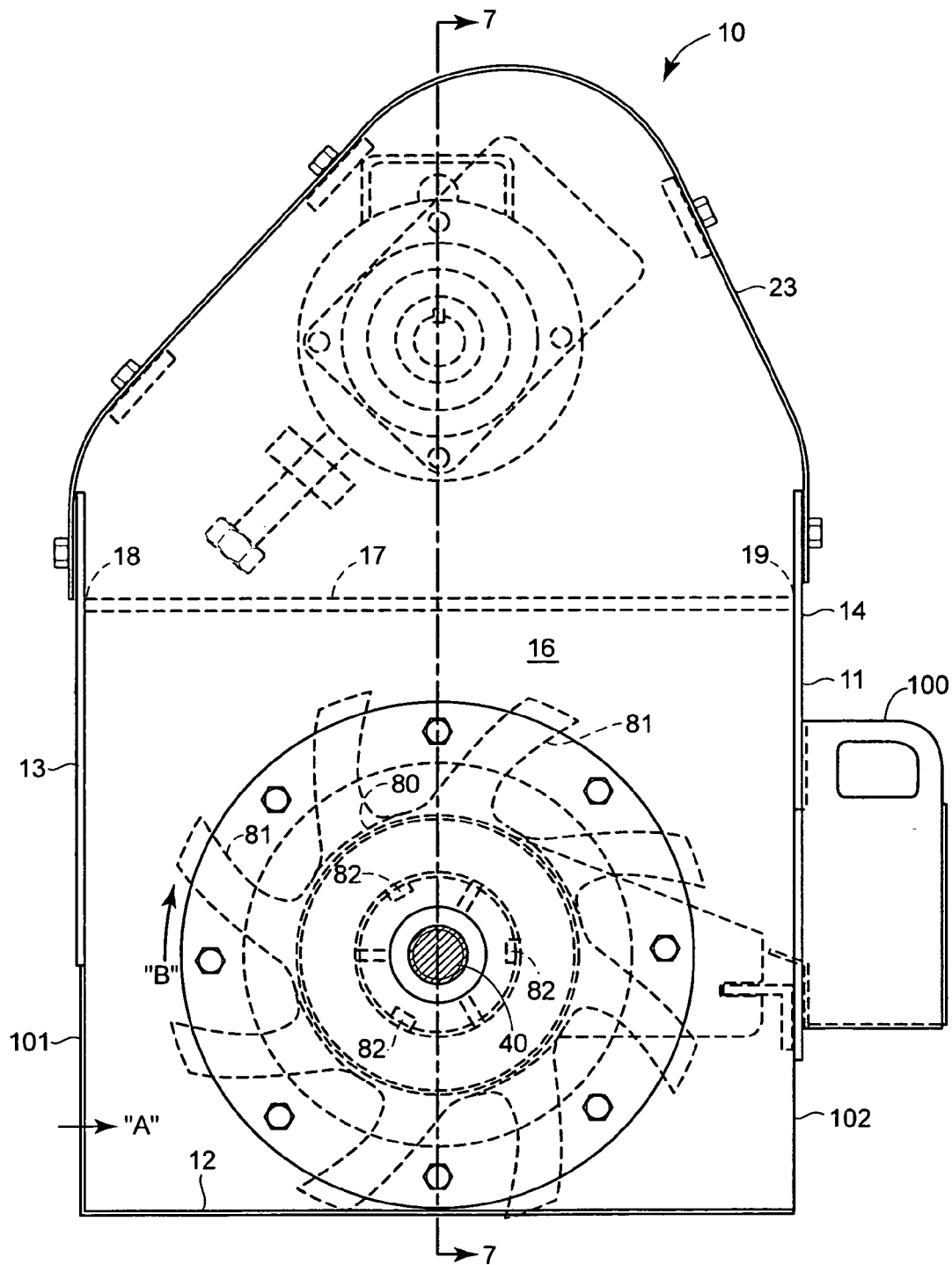
FIG. 4 shows a right side view of the shredder apparatus shown in FIG. 1.
Figure 5:
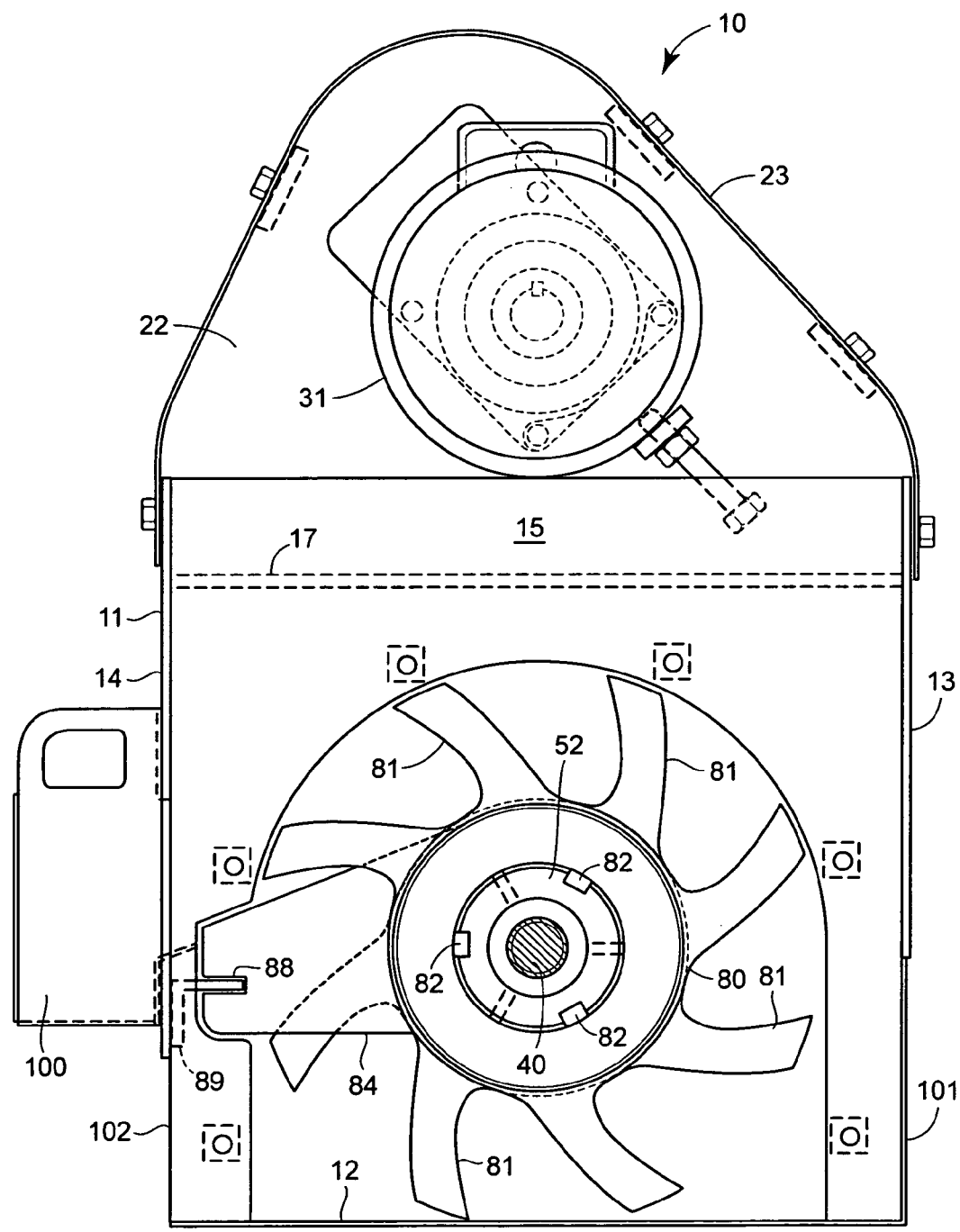
FIG. 5 shows a left side view of the shredder apparatus shown in FIG. 1 with a portion of the shredder frame removed.
Figure 6:
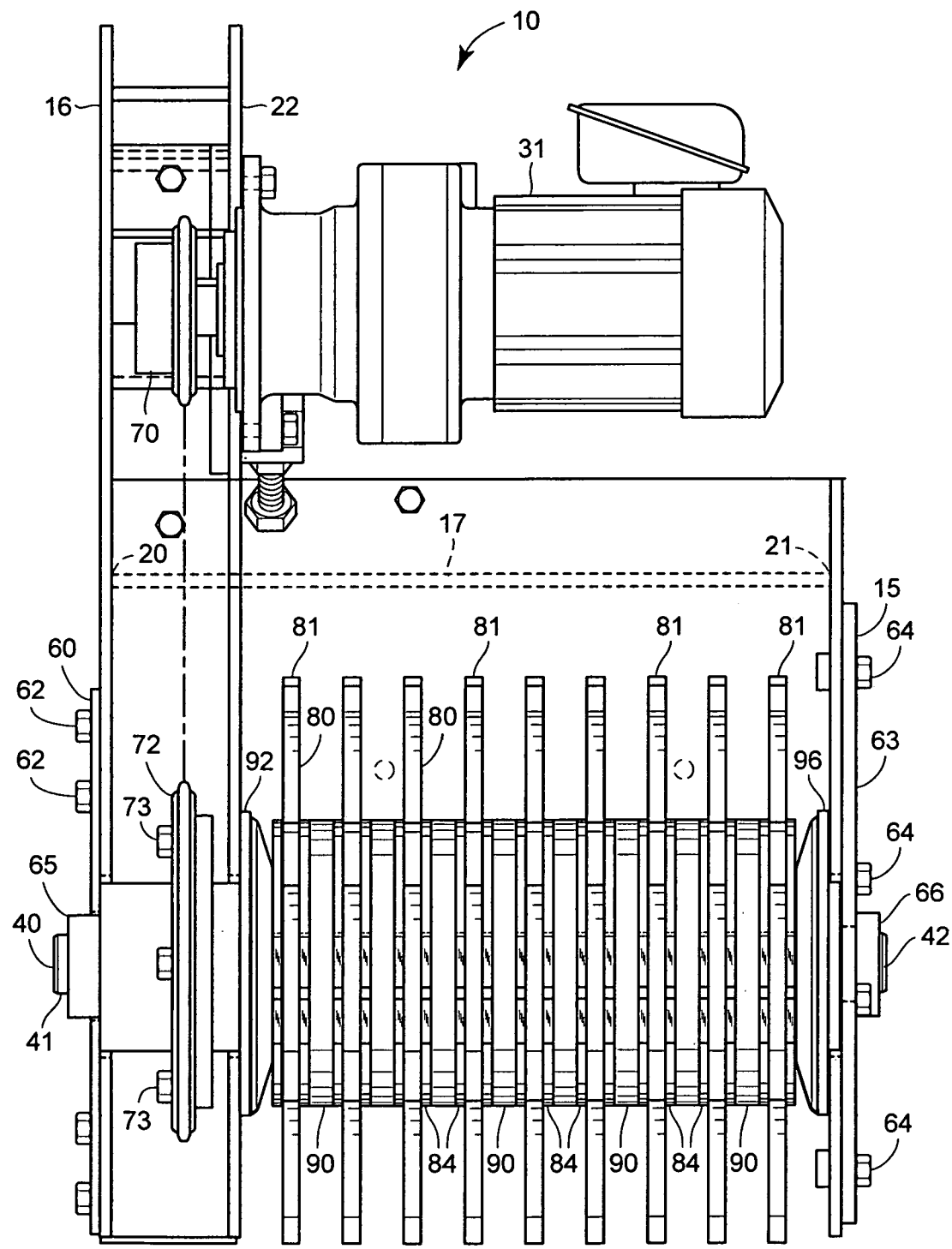
FIG. 6 shows a rear view of the shredder apparatus shown in FIG. 1 with a portion of the shredder frame removed.
Figure 7:
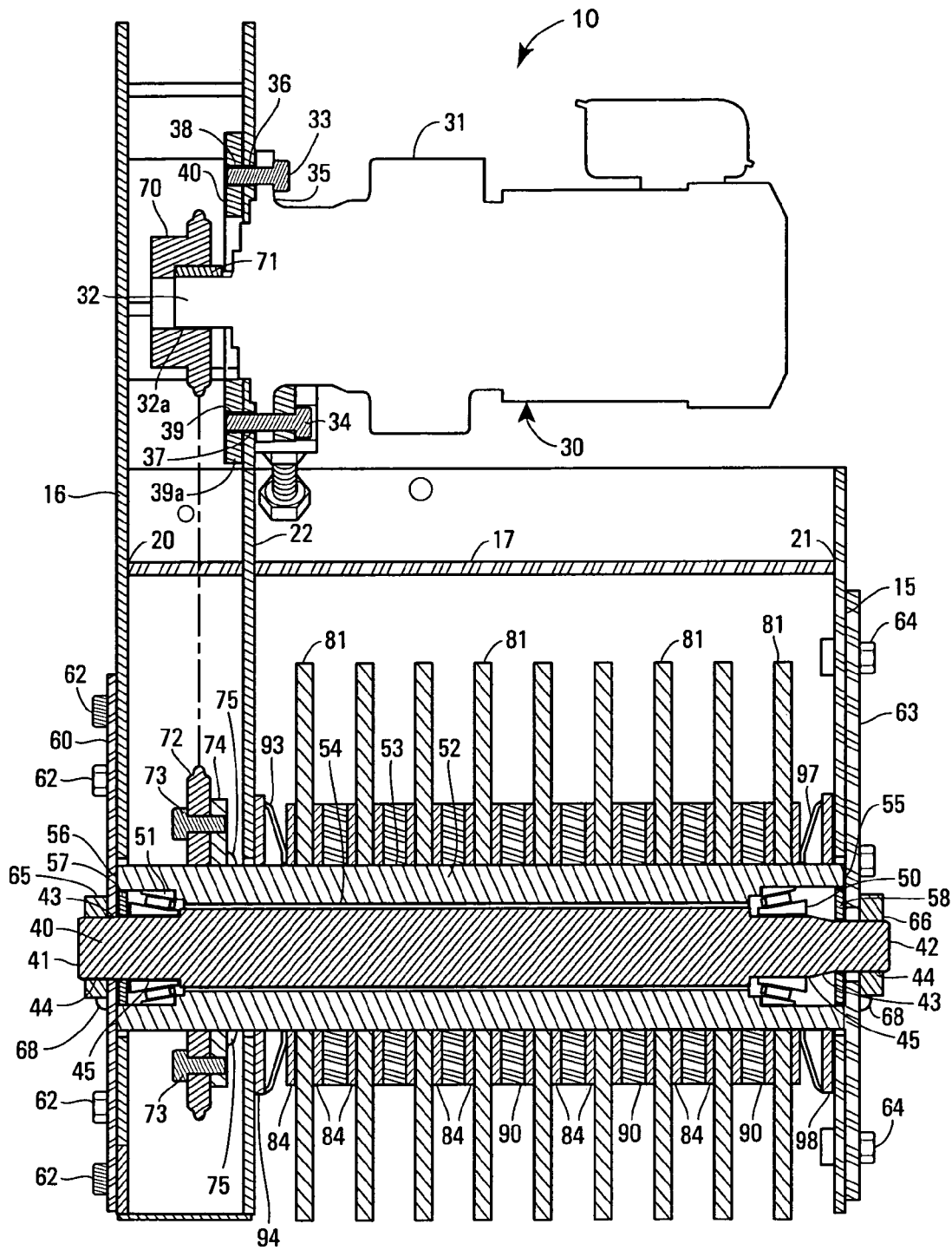
FIG. 7 shows a section view taken along line 7—7 in FIG. 4.

An exemplary shredder apparatus 10 comprises housing assembly 11 that, as illustrated in FIGS. 4, 5 and 7, includes base 12, front wall 13, back or rear wall 14 and side walls 15, 16. Open top plate 17 is fixed at top plate ends 18, 19 and top plate sides 20, 21 to the appropriate housing front, back and side walls.

Motor mount wall 22 extends upward from base 12 (FIG. 7). Wall 22 is substantially parallel to and spaced from sidewall 16. Top wall 23, which can be made of either a rigid or flexible material, is removably attached to walls 16, 22.

As illustrated in FIG. 7, drive assembly 30 includes motor 31 having a shaft 32 with a bushing 32a keyed to the shaft. Screws 33, 34 extend through openings in motor flange 35 and openings 36, 37 in wall 22. The screws thread into tapped holes 38, 39 in motor mounting plate 39a, which abuts wall 22. It has been found that a 460 Volt, three phase, 60 Hz electric motor may be employed. It is appreciated that other size motors could be utilized by one of ordinary skill in the art.

Positioned below motor 31 is fixed shaft 40 which is greater in length than the distance between spaced sidewalls 15, 16. Elongated shaft 40 is tapered for a portion at each shaft end 41, 42. Taper 43 extends inwardly for a discrete distance from each shaft end. Taper 43 comprises a first tier 44 and a second tier 45.

A bearing assembly comprising spaced bearings 50, 51 is seated on shaft 40, each bearing being located on a tapered portion of shaft 40. In this particular embodiment illustrated in the drawings, bearings 50, 51 seat on shaft taper tier 45.

Cylindrical rotor 52 having an outer surface 53 and inner surface 54 is positioned over fixed shaft 40. Rotor 52 is recessed at each rotor end 55, 56 as illustrated, for example, in FIG. 7. Each bearing is positioned so that it is sandwiched between shaft 40 and rotor 52. Bearing 50 is disposed within a rotor recess at rotor end 55 while bearing 51 is disposed within a rotor recess at rotor end 56. A first seal member 57 is disposed on shaft surface 45 at rotor end 56. A second seal member 58 is located on shaft surface 45 at rotor end 55. The seal member may be made of any conventional sealing material such as polyvinyl chloride (PVC) or Buna N, so long as the material aids in providing a seal at the location of the rotor ends.

Faceplate 60 is bolted at 62 to sidewall 16, while faceplate 63 is bolted at 64 to sidewall 15. Shaft end 41 extends through an opening in faceplate 60, and shaft end 42 extends through an opening in faceplate 63. Faceplate 60 is located adjacent seal member 57, and faceplate 63 is positioned adjacent seal member 58.

Lock member 65 is disposed on shaft 40 at shaft end 41 and seats against faceplate 60. Lock member 66 is disposed on shaft 40 at shaft end 42 and seats against faceplate 63. Each lock member is illustrated as being welded at 68 to a respective faceplate. If desired, other shaft locking arrangements, for example, a two piece clamp trough, could be employed. Similarly, the shaft ends could be threaded and lock nuts could be utilized in place of the locking arrangement shown in the drawings. With the particular arrangement shown in the drawings, bearings 50 and 51 are placed in a relatively closed or sealed location formed by shaft 40, rotor 52 and seal members 57, 58.

A first sprocket 70 is keyed at 71 to motor shaft 32 at the location of bushing 32a (FIG. 7). A second sprocket 72 is bolted at 73 to sprocket mounting plate 74, the latter being welded at 75 to rotor 52 at outer rotor surface 53. A drive chain, not shown, connects sprockets 70, 72 whereupon activation of motor 31 and the sprocket chain assembly, rotor 52 rotates on bearings 50, 51. Shaft 40 is fixed in place and does not rotate. Referring to FIG. 7, drive assembly 30 includes motor 31 and the sprocket chain assembly, the latter being enclosed by walls 16, 22 and 23.

A plurality of spaced shredder wheels 80, each wheel including spaced shredder arms 81 extending outwardly from the wheel, is keyed at different locations 82 to rotor 52. A plurality of spaced shredder comb members 84, illustrated, for example, in FIGS. 5 and 8, is located on rotor 52, and is positioned so that a comb member 84 is adjacent a shredder wheel 80.

Figure 8:
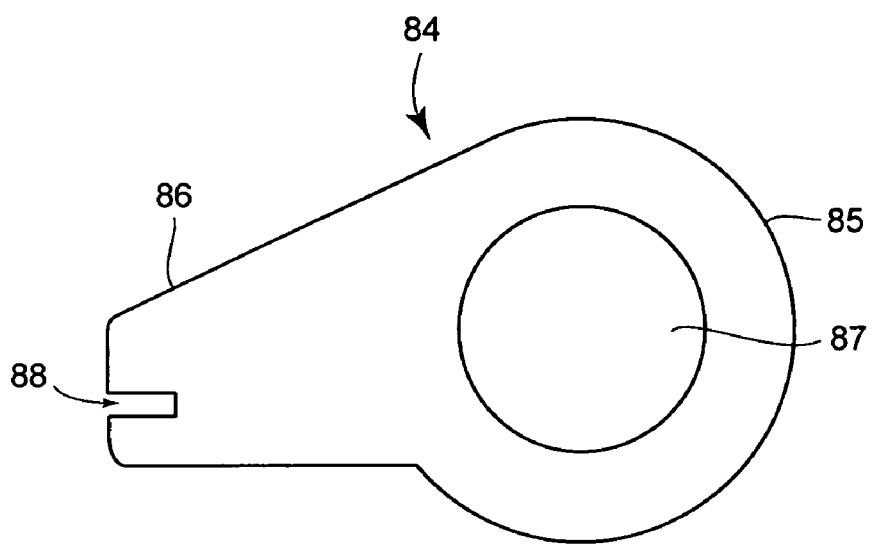
FIG. 8 shows a side view of a shredder comb member employed in the embodiment illustrated in FIGS. 1–7.
Figure 2:
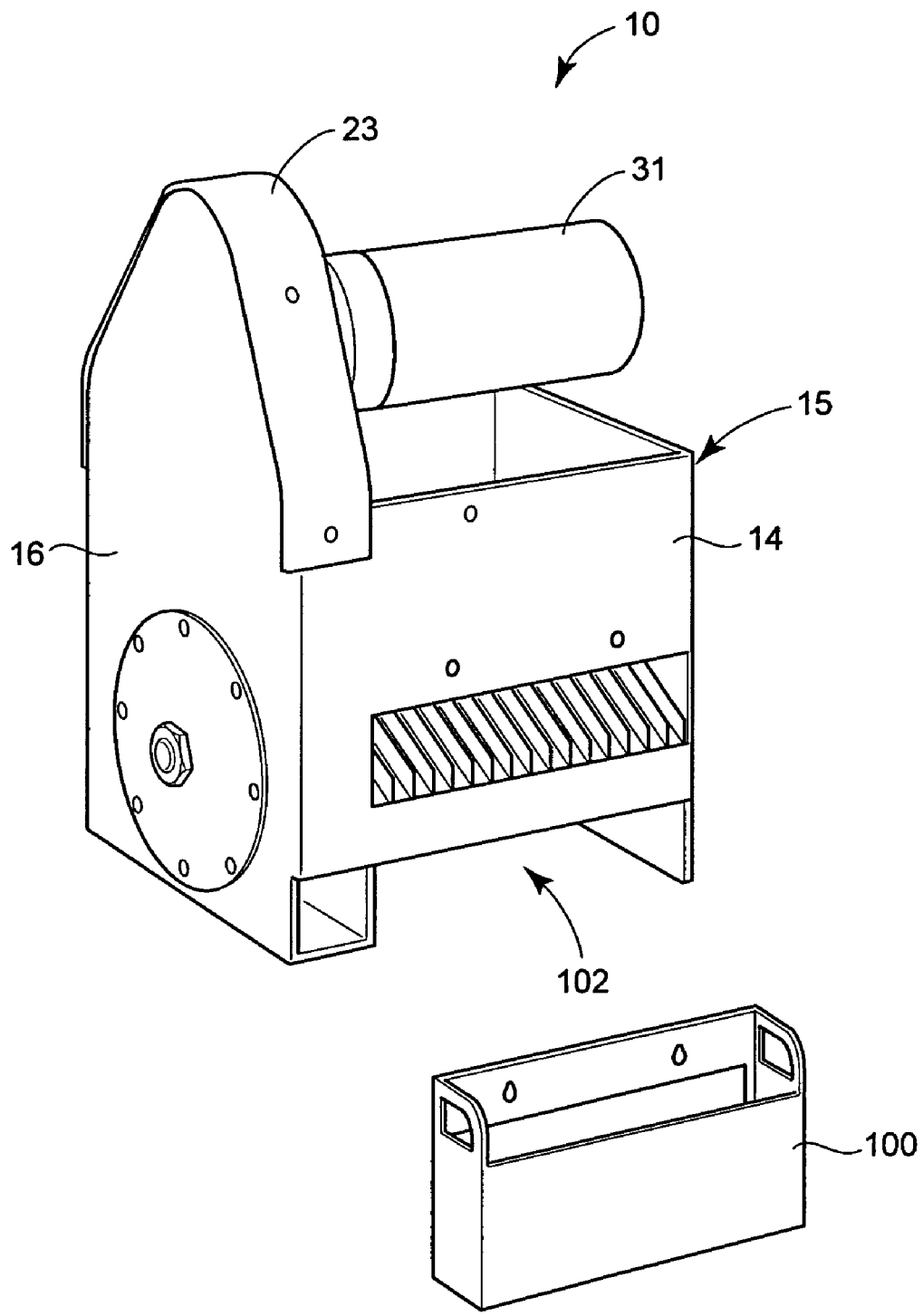
FIG. 2 shows a rear perspective view of the shredder apparatus shown in FIG. 1 with the dropout tray removed from its normal position on the shredder frame.
Figure 3:
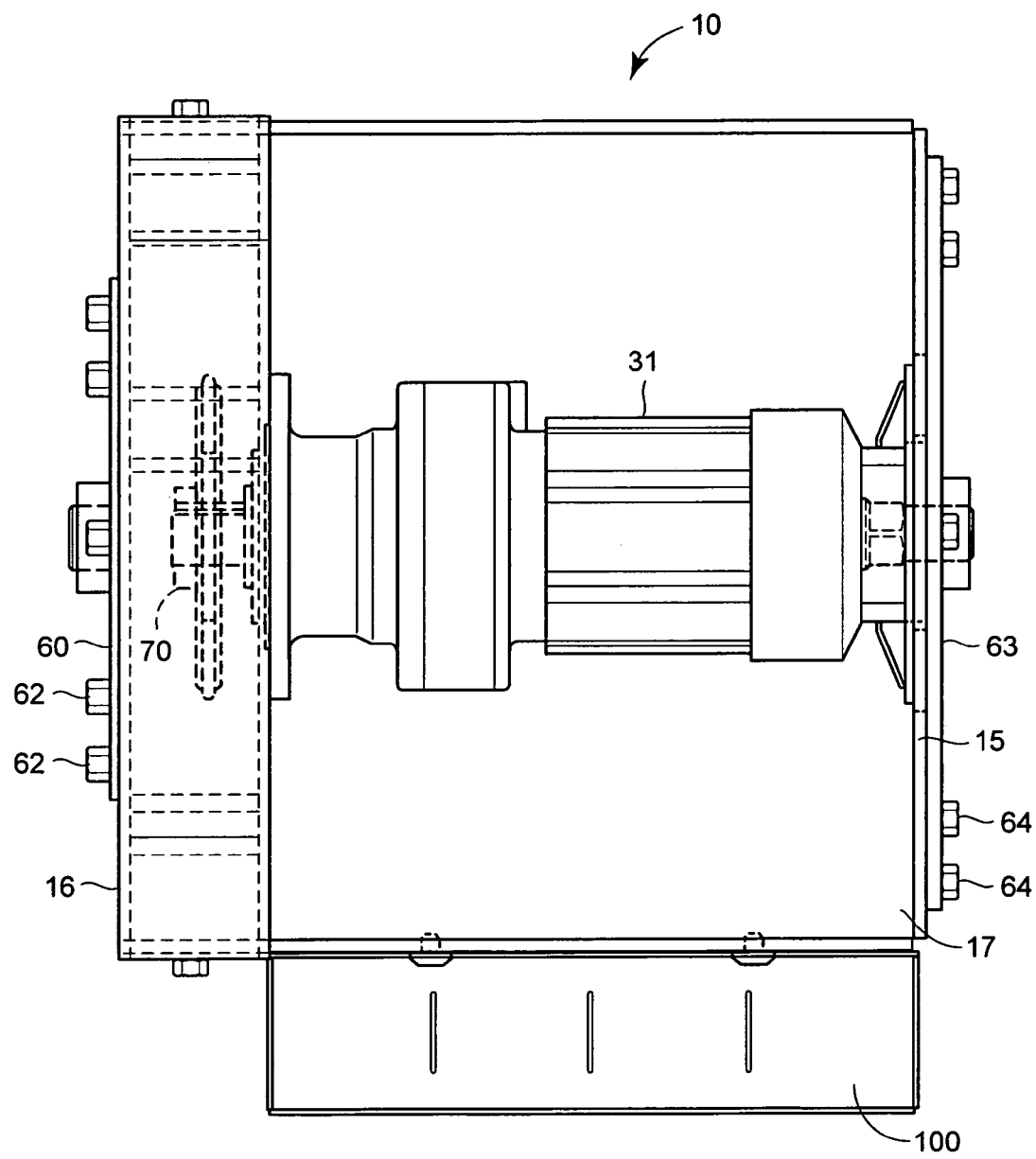
FIG. 3 shows a plan view of the shredder apparatus shown in FIG. 1.

With reference to FIG. 8, each comb member 84 includes a comb portion 85 and a comb arm 86. Opening 87 is formed in comb portion 85, while a key slot 88 is formed at the outboard end of comb arm 86. Each comb member is adapted to be inserted on rotor 52, and seats on the rotor at the location of comb opening 87; however, the comb members do not rotate with rotor 52. End comb member is keyed at the location of slot 88 to key bracket 89, the later being fixed to rear wall 14, as seen in FIG. 5. Accordingly, shredder wheels 80 rotate relative to fixed adjacent comb members 84 and together, the shredder wheels and comb members cooperate to shred or otherwise cut wet chip material passing through shredder apparatus 10.

Spacers, in the form of washer-like members 90, are disposed on rotor 52 and positioned between adjacent comb members 84, as shown in FIG. 7. The spacers 90 serve to space the shredder wheels 80 apart so that, should any vertical misalignment of a shredder wheel 80 occur, the spacer 90 will preclude contact with another shredder wheel 80.

Compression spring assembly 92 formed of compression spring 93 and spring plate 94 is positioned against the outboard surface of comb member 84 located near one end 56 of rotor 52. Compression spring assembly 96 formed of compression spring 97 and spring plate 98 is positioned against the outboard surface of comb member 84 near the opposite rotor end 55.

A heavy object dropout tray or box 100 is removably attached to the outer surface of rear wall 14 in a manner well known to a person of ordinary skill in the art.

In operation, wet chip materials to be shredded comprising granular wet chips, stringy wet chips, unwanted solids (such as bolts, nuts, etc.) and lubricating, cooling, flume or other fluid are delivered to the opening 101 in the front wall 13 of shredder 10. The wet chip material moves into the shredder traveling in the direction shown by arrow "A" (FIG. 4). Upon actuation of drive assembly 30, rotor 52 rotates and travels in a direction, shown by arrow "B," opposite to the direction of wet chip material travel. As the wet chip material passes into shredder 10, shredder arms 81 on shredder wheels 80 engage the material and cause at least the stringy wet chip material to be lifted upwardly in the direction of arrow "B" toward a shredding station.

At the shredding station, shredder wheels 80 and shredder comb members 84 engage and cooperate to shred the stringy wet chip material and reduce it to granular wet chips. As rotor 52 continues to rotate, shredded granular wet chips drop to the bottom of shredder 10. Unwanted solids in the form of nuts, bolts and the like which may have been lodged or otherwise entrained in the stringy wet chip material to be shredded either drop out of the material or are thrown by centrifugal force into collection tray 100. The shredded wet chips now reduced to a desired size then can be processed out of shredder apparatus 10 at the opening 102 in rear wall 14 in a centrifugal separation system whereby the wet chips are separated into dry chips and fluid.

Figure 1:
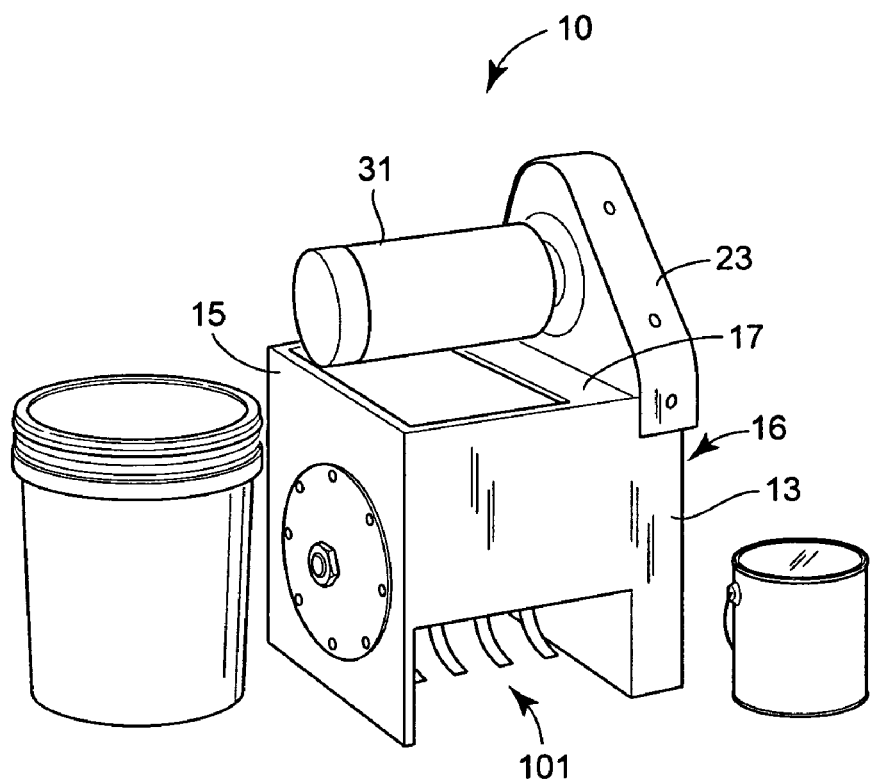
FIG. 1 shows a front perspective view of an exemplary shredder apparatus, and provides a size comparison between the shredder apparatus, a five-gallon container and a one gallon container.

Shredder apparatus 10 can be made of a reduced size such as illustrated in FIG. 1, where shredder apparatus 10 is shown compared in size to a five-gallon container and a one-gallon container. One particular shredder apparatus 10, for example, has a width of 16¼ inches, a depth of 19 inches, and a height of 26 inches. A reduced-size shredder apparatus is particularly desirable in those applications where there is a space constraint.

Additionally, the use of spacer washers 90 serve to minimize shredder wheel alignment problems because the shredder wheels 80 have been spaced a satisfactory distance from one another.

Figure 9:
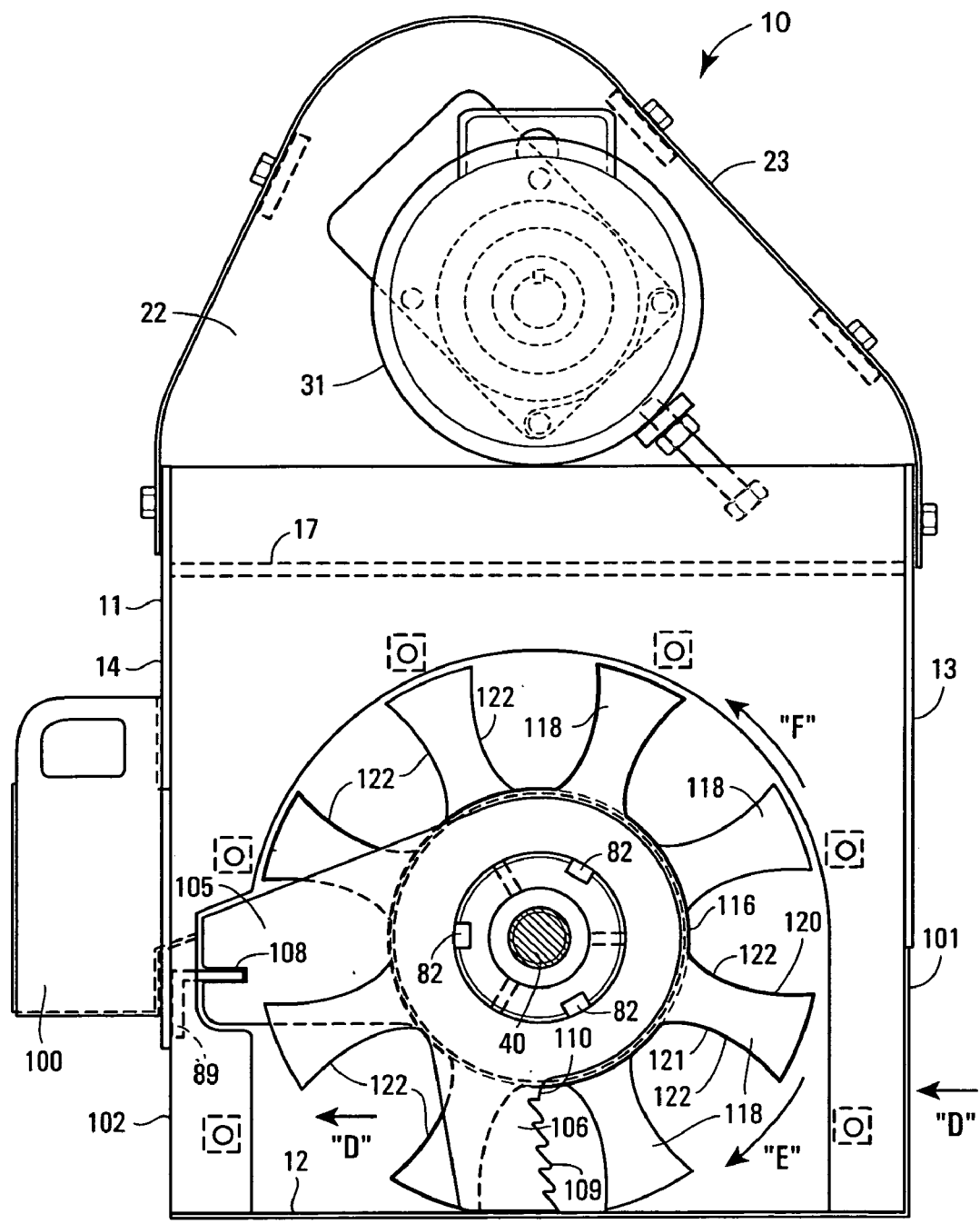
FIG. 9 shows a left side view of a further embodiment of a shredder apparatus in which the comb members include first and second spaced arms, with a portion of the shredder frame removed.
Figure 10:
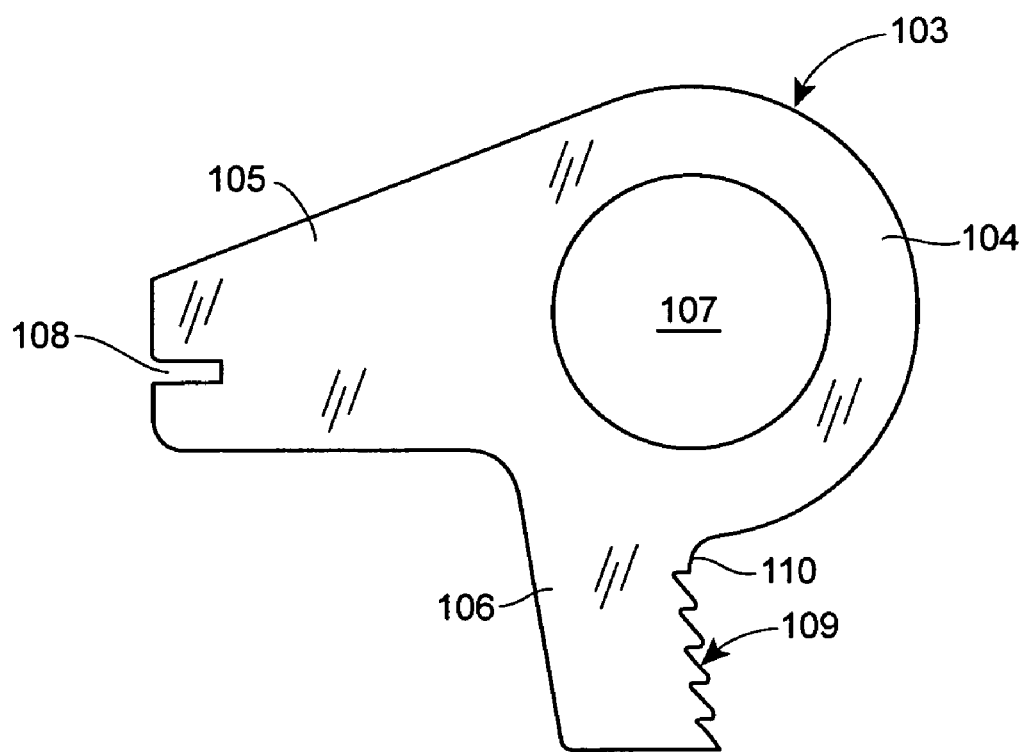
FIG. 10 shows a side view of a shredder comb member employed in the embodiment illustrated in FIG. 9; and, FIG. 11 shows a schematic block diagram of the drive assembly and controller assembly employed in the embodiment illustrated in FIG. 9.
Figure 11:
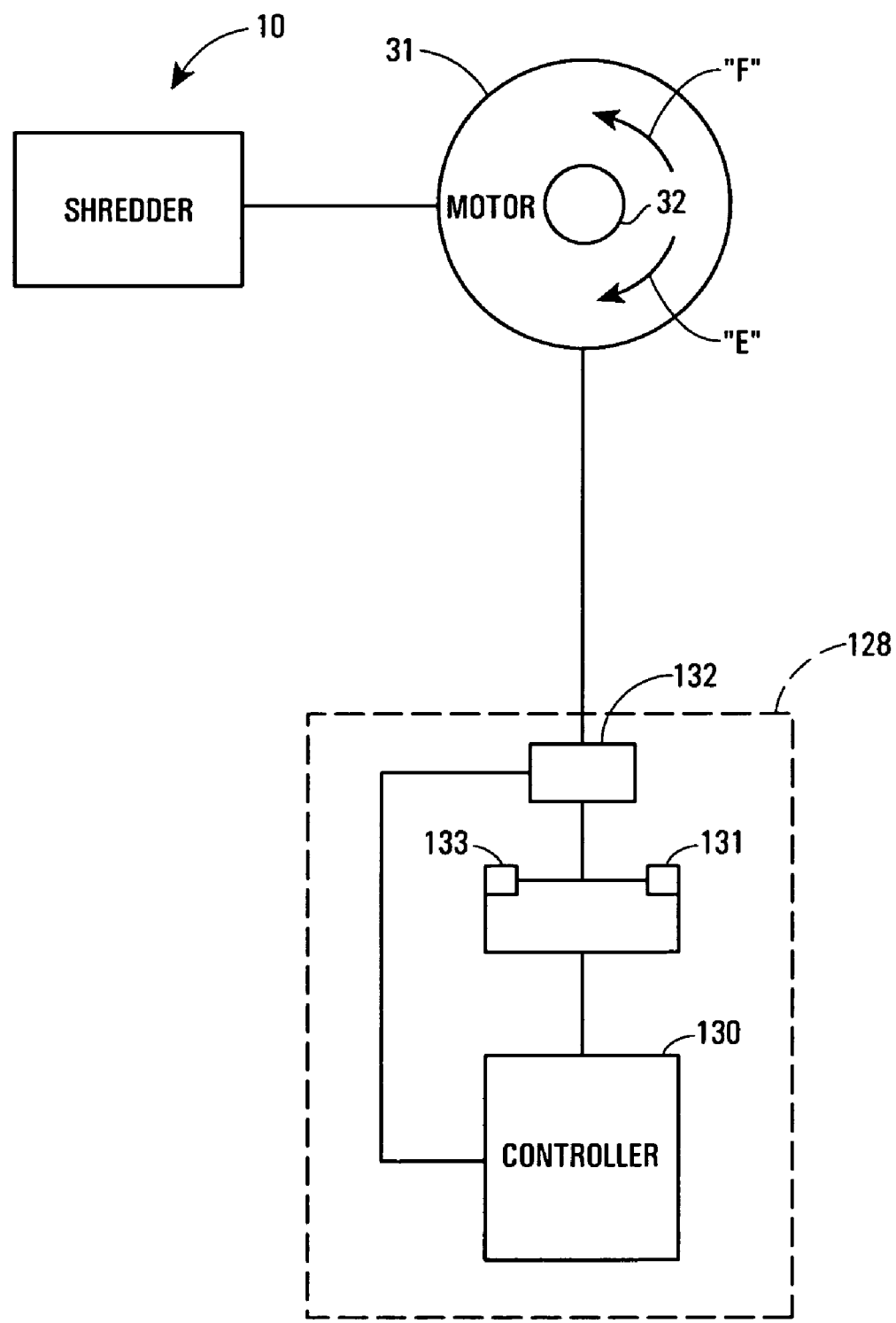

A further embodiment of a shredder apparatus 10 is illustrated in FIGS. 9–11. In this particular embodiment, comb members 103 replace comb members 84. Each comb member 103 includes base portion. 104, and a first arm 105 and a second, spaced arm 106 extending outwardly from base portion 104.

An opening 107 is formed in base portion 104, while a key slot 108 is formed at the outboard end of comb arm 105. Comb arm 106 preferably is serrated at 109 along substantially the length of one side 110 of comb arm 106.

Each comb member 103 is adapted to be inserted on rotor 52 and seats on the rotor 52 at the location of comb opening 107; however, comb members 103 do not rotate with rotor 52. Each comb member 103 is keyed at the location of slot 108 to key bracket 89, the later being fixed to rear wall 14, as seen in FIG. 9.

In addition to replacing the comb members 84 with the comb members 103, shredder wheels 80 are replaced with shredder wheels 116. Wheels 116 each include spaced shredder arms 118 extending outwardly from the center of wheel 116. Each shredder arm 118 has sides 120, 121 formed or grooved inwardly at 122 to define a concave surface, as illustrated in FIG. 9. Accordingly, in this embodiment, shredder wheels 116 rotate relative to fixed adjacent comb members 103, and together the shredder wheels 116 and comb members 103 cooperate to shred or cut wet chip materials at the locations of comb arms 105 and 106.

In particular, during the operation of the embodiment of the shredder apparatus 10 of FIG. 9, wet chip materials to be shredded, comprising granular wet chips, stringy wet chips, unwanted solids (such as bolts, nuts, etc.), and lubricating, cooling, flume or other fluid, are delivered to the opening 101 in the front wall 13 of shredder apparatus 10. The wet chip material moves into the shredder apparatus 10 traveling in the direction shown by the arrow "D" in FIG. 9.

Upon actuation of drive assembly 30, rotor 52 rotates and travels in a direction, represented by an arrow "E" in FIG. 9, that is the same direction as the direction of the wet chip material travel. As the wet chip material passes into shredder 10, shredder arms 118 engage the wet chip materials and direct at least the stringy wet chips toward a shredding station disposed at comb arm 106. Comb arms 106 and shredder arms 118 cooperate to shred the stringy wet chips.

In the event that a heavy, unwanted solid enters shredder apparatus 10, the solid travels to the shredder station disposed at the comb arm 106. Inasmuch as the shredder apparatus 10 cannot shred the unwanted solid, an increase in the motor amperage occurs, whereupon the motor 31 stops and changes direction of rotation. With the change in the direction of rotation of the motor 31 (and in particular motor shaft 32), rotor 52 will change its direction of rotation, and the shredder wheels 116, fixed to the rotor 52, will the rotate in the direction indicated by arrow "F" in FIG. 9. As the shredder wheels 116 rotate in the direction of arrow "F", the unwanted solid will be carried on one or more surfaces 122 on the shredder arm 118, and transported in the direction of arrow "F". The unwanted solid may be transported in somewhat of a circular direction until the unwanted solid, for example, drops onto the top of first comb arm 105 and passes therealong into drop out tray 100. After rotor 52 travels in the direction of arrow "F" for a period of time, for example, until at least the unwanted solid passes into tray 100, the motor 31 again changes direction and rotor 52 travels in the direction of arrow "E", whereupon shredding of the wet chip material resumes.

FIG. 11 illustrates a controller system 128 associated with the embodiment of the shredder apparatus 10 in FIG. 9. The controller system 128 includes a controller 130. When controller 130 is turned to an "on" position, the controller 130 closes forward switch 131 and actuates motor 31, which causes motor shaft 32 to rotate in the direction of arrow "E".

Upon contact of an unwanted solid with comb arm 106, increased amperage occurs in motor 31 and is sensed by sensor 132. The controller 130 receives signals from the sensor 132 representative of the increased amperage, and, in response, turns off motor 31 and opens forward switch 131 to a disconnect position. Following a dwell period of, for example, approximately one second, the controller 130 closes reverse switch 133 and actuates motor 31, causing motor shaft 32 to rotate in the direction of arrow "F".

Following a time period during which an unwanted solid is transported to the top of comb arm 105, the controller 130 turns off motor 31 and opens reverse switch 133. Following a dwell period of, for example, approximately one second, the controller closes forward switch 131 and actuates motor 31, whereupon motor shaft 32 again rotates in the direction of arrow "E" and shredding occurs at the location of shredder arm 106.

It is appreciated that while one system 128 for actuating motor 31 to permit shaft rotation in the direction of arrows "E" and "F" has been shown, other systems for rotating motor shaft 32 in the desired directions would be apparent to one of ordinary skill in the art. For example, rather than using the controller 130 to control the motor 31 to make motor shaft 32 rotate in a particular direction for a particular amount of time, the controller may control the motor 31 to make the motor shaft rotate in a particular direction for a particular number of revolutions or over a particular angular distance.

While the bales of stringy wet chips are shredded principally at the shredder stations at the second comb arms 106 in the embodiment of FIGS. 9–11, shredding can also occur at the location of the first comb arms 105 during the course of the unwanted solid removal.

Similarly, while comb arm 106 has been shown to have a serrated shredding or cutting surface 109 along side 110, it may be that, in some applications, serrations are not required. Accordingly, a person of ordinary skill in the art could select other shapes for the sides 110, for example, a smooth surface.

While the shredder apparatus 10 has been shown standing alone, it is appreciated the shredder apparatus 10 could be employed in a flume, where bales of stringy wet chip material, granular wet chips and unwanted solids are transported in a fluid to the shredder apparatus 10. Shredder wheels 80, each with its respective shredder arms 81, would engage and lift the stringy wet chip material upward, at least partially out of the flume, and then shred the material. An example of the use of a shredder apparatus employed in a flume application is shown and disclosed in the co-pending application Ser. No. 10/100,786, filed by the present inventor on Mar. 19, 2002, the disclosure and claims of which are incorporated herein by reference.

While one or more embodiments have been illustrated and described in detail herein, it will be understood that modifications and variations thereof may be effected without departing from the spirit of the invention and the appended claims.

The invention claimed is:

1. A shredder apparatus for shredding wet chip materials into granular wet chips, said apparatus comprising:
    a frame;
    a shaft fixedly attached to said frame, said shaft having a length and a first end and a second end;
    a bearing assembly disposed on said shaft and located inwardly from said shaft ends;
    a rotatable rotor having a cylindrical wall and a first end and second end and a length less than said shaft length, said rotor being disposed on said bearing assembly between said rotor ends;
    a plurality of spaced first shredder members attached to and rotatable with said rotor;
    a plurality of spaced second shredder members attached to said frame and mounted on but free from rotation with said rotor, said second shredder members being positioned relative to said first shredder members whereby a first shredder member and a second shredder member are adapted to cooperate to shred wet chips;
    first and second seal members, said first seal member being disposed on said shaft inwardly of said first shaft end and said second seal member being disposed on said shaft inwardly of said second shaft end to substantially enclose and seal said bearing assembly between said rotor and said shaft; and,
    a drive assembly for rotating said rotor while said shaft remains in a fixed position whereby upon actuation of said drive assembly, said rotor will rotate causing said first and second shredder members to cooperate to shred wet chip material in said shredder apparatus.

2. A shredder apparatus in accordance with claim 1 in which the diameter of said shaft is reduced in size for a portion extending inwardly from each shaft end for a distance along the length of the shaft;
    said bearing assembly comprises first and second bearings, said first bearing being seated on said shaft at a portion of said reduced shaft diameter and at a distance inwardly from one shaft end and said second bearing being seated on said shaft at the location of said remaining reduced shaft diameter portion and at a distance inwardly from said remaining shaft end.

3. A shredder apparatus in accordance with claim 2 in which said first seal member is positioned at said first rotor end and said second seal member is positioned at said second rotor end.

4. A shredder apparatus in accordance with claim 3 in which said first rotatable shredder members each comprise a shredder wheel having a plurality of spaced shredder arms extending outwardly therefrom and said second shredder members each comprise a comb member attached to said frame.

5. A shredder apparatus in accordance with claim 1 in which said drive assembly rotates said rotor in a direction opposite to the direction of flow of wet chip material entering said shredder apparatus.

6. A shredder apparatus in accordance with claim 4 in which said comb members each include a first comb portion having an opening and adapted to seat on said rotor at the location of said opening; and, a comb arm attached to said frame.

7. A shredder apparatus in accordance with claim 6 in which said comb arm is keyed to said frame.

8. A shredder apparatus in accordance with claim 4 and further including a spacer disposed between said first shredder members for spacing said first shredder members from one another.

9. A shredder apparatus in accordance with claim 4 in which said shaft is tapered along said reduced diameter shaft portions.

10. A shredder apparatus in accordance with claim 4 in which said rotor is recessed at each rotor end and one of said bearings is disposed in one of said rotor recesses and said remaining bearing is disposed in said remaining rotor recess.

11. A shredder apparatus for shredding wet chip materials, said apparatus comprising:
    a frame;
    a shaft having first and second shaft ends and a length; said shaft attached to said frame at the location of said first and second shaft ends;
    a bearing assembly seated on said shaft;
    a rotatable cylindrical shaped rotor having a first end and a second end and a length less than said shaft length, said rotor being disposed over said shaft and seated on said bearing assembly;
    a first seal member disposed on said shaft and located at said first rotor end;
    a second seal member disposed on said shaft and located at said second rotor end;
    said seal members and rotor substantially enclosing and sealing said bearing assembly between said shaft and rotor;

a drive assembly for rotating said rotor while said shaft remains in a fixed position;

a plurality of spaced first shredder members attached to said rotatable rotor for rotation with said rotor; and, a plurality of spaced second shredder members attached to said frame and mounted on but free from rotation with said rotor, said first and second shredder members being adapted to cooperate to shred wet chip material when said rotor is rotated.

12. A shredder apparatus in accordance with claim 11 wherein said shaft has a first reduced diameter portion for a distance extending inwardly from said first shaft end and a second reduced diameter portion for a distance extending from said second shaft end; and, said bearing assembly comprising two bearings, one of said bearings being seated on said first reduced diameter shaft portion and said remaining bearing being seated on said remaining reduced diameter shaft portion.

13. A shredder apparatus in accordance with claim 11 or 12 in which said first shredder members each comprise a shredder wheel having a plurality of spaced shredder arms extending outwardly from said wheel.

14. A shredder apparatus in accordance with claim 13 in which said second shredder members each comprise a comb member having a first portion seated on said rotor but free from rotation with said rotor; and, an arm attached to said frame.

15. A shredder apparatus in accordance with claim 14 in which said comb arm is keyed to said frame.

16. A shredder apparatus in accordance with claim 14 in which said first comb portion has an opening therein for receipt of said rotor.

17. A shredder apparatus in accordance with claim 11 in which said frame includes a first sidewall;

a second mounting sidewall spaced from said first sidewall;

a top wall extending over said first and mounting sidewalls; and, said drive assembly disposed in the space between said first and second sidewalls, said enclosed drive assembly including a motor drive shaft assembly; and, a sprocket assembly attached to said motor drive shaft assembly and said rotor.

18. A shredder apparatus in accordance with claim 1 or 11 and further including spring means disposed on said rotor compressing said first and second shredder members.

19. A shredder apparatus in accordance with claim 1 or 11 and further including a dropout tray attached to said frame.

20. A shredder apparatus for shredding wet chip materials into granular wet chips, said apparatus comprising:

a frame;

a shaft attached to said frame, said shaft having a first end and a second end;

a bearing assembly disposed on said shaft;

a rotatable rotor having a cylindrically shaped closed wall and a first end and second end, said rotor being disposed on said bearing assembly;

a plurality of spaced first shredder members attached to and rotatable with said rotor;

a plurality of spaced second shredder members attached to said frame and mounted on but free from rotation with said rotor, said second shredder members being positioned relative to said first shredder members whereby a first shredder member and a second shredder member are adapted to cooperate to shred wet chips;

a seal assembly disposed between said rotor and said shaft for substantially enclosing and sealing said bearing assembly between said shaft and rotor; and a drive assembly for rotating said rotor while said shaft remains in a fixed position whereby, upon actuation of said drive assembly, said rotor will rotate causing said first and second shredder members to cooperate to shred wet chip material in said shredder apparatus.

21. A shredder assembly in accordance with claim 20 in which said bearing assembly comprises a first bearing and a second bearing; said first bearing being located contiguous to said first shaft end and said second bearing being located contiguous to said second shaft end.

22. A shredder assembly in accordance with claim 21 in which said seal assembly comprises a first seal located contiguous to said first shaft end and a second seal located contiguous to said second shaft end, said first and second bearings being located between said first and second seals.

23. A shredder assembly in accordance with claim 20 in which said first rotatable shredder members each comprise a shredder wheel having a plurality of spaced shredder arms extending outwardly therefrom and said second members each comprise a comb member attached to said frame.

24. A shredder apparatus in accordance with claim 23 in which said comb members each comprise a first comb portion having an opening and adapted to receive said rotor at the location of said opening and a comb arm attached to said frame.

25. A shredder apparatus in accordance with claim 24 in which said comb arm is keyed to said frame.

26. A shredder apparatus in accordance with claim 20 and further including a spacer disposed between said first shredder members for spacing first shredder members from one another.

27. A shredder apparatus in accordance with claim 22 wherein said shaft is reduced in diameter for a portion extending inwardly from each end of said shaft;

said first bearing is seated on a reduced shaft portion at one shaft end and said second bearing seated on said reduced shaft portion at said second shaft end.

28. A shredder apparatus in accordance with claim 6 in which said comb members each include a second comb arm spaced from said first comb arm.

29. A shredder apparatus in accordance with claim 28 in which at least said second comb arm is serrated.

30. A shredder apparatus in accordance with claim 4 in which each of said shredder arms is grooved along the length of said shredder arm.

31. A shredder apparatus for shredding wet chip materials into granular wet chips, said apparatus comprising:

a frame;

a shaft attached to said frame, said shaft having a length and a first end and a second end;

a bearing assembly disposed on said shaft and located inwardly from said shaft ends;

a rotatable cylindrical shaped rotor having a first end and second end and a length less than said shaft length, said rotor being disposed on said bearing assembly;

first and second seal members, said first seal member being disposed on said shaft inwardly of said first shaft end and said second seal member being disposed on said shaft inwardly of said second shaft end whereby said bearing assembly is substantially enclosed and sealed within said rotor and shaft;

a plurality of spaced first shredder members attached to and rotatable with said rotor;

a plurality of spaced second shredder members attached to said frame and mounted on but free from rotation with said rotor, said second shredder members having a plurality of spaced arms and being positioned relative to said first shredder members whereby a first shredder member and a second shredder member are adapted to cooperate to shred wet chips at the location of said two second shredder arms; and, a drive assembly for rotating said rotor while said shaft remains in a fixed position whereby upon actuation of said drive assembly, said rotor will rotate causing said first and second shredder members to cooperate to shred wet chip material in said shredder apparatus.

32. A shredder apparatus in accordance with claim 31 in which the diameter of said shaft is reduced in size for a portion extending inwardly from each shaft end for a distance along the length of the shaft; and, said bearing assembly comprises first and second bearings, said first bearing being seated on said shaft at a portion of said reduced shaft diameter and at a distance inwardly from one shaft end and said second bearing being seated on said shaft at the location of said remaining reduced shaft diameter portion and at a distance inwardly from said remaining shaft end.

33. A shredder apparatus in accordance with claim 32 in which said first seal member is positioned at said first rotor end and said second seal member is positioned at said second rotor end.

34. A shredder apparatus in accordance with claim 31 or 33 in which said first rotatable shredder members each comprise a shredder wheel having a plurality of spaced shredder arms extending outwardly therefrom and said second shredder members each comprise a comb member having a portion attached to said frame and a plurality of spaced comb arms extending from said comb portion.

* * * * *